United States Patent [19]

Es

[11] Patent Number: 4,964,772

[45] Date of Patent: Oct. 23, 1990

[54] FIXING PEG FOR USE IN FRIABLE MATERIALS

[75] Inventor: Willy Es, Asnieres, France

[73] Assignee: Plombelec, Loire, France

[21] Appl. No.: 457,669

[22] Filed: Dec. 27, 1989

[30] Foreign Application Priority Data

Dec. 28, 1988 [FR] France ............................ 88 17296

[51] Int. Cl.⁵ .................... F16B 15/00; F16B 39/02
[52] U.S. Cl. .................................. 411/82; 411/446; 411/477; 405/261
[58] Field of Search ............. 411/82, 258, 69, 446, 411/477, 922; 248/205.3, 205.4; 405/261; 52/704

[56] References Cited

U.S. PATENT DOCUMENTS

| 2,940,712 | 6/1960 | Lloyd-Young | 411/477 |
| 4,475,329 | 10/1984 | Fischer | 52/704 |

FOREIGN PATENT DOCUMENTS

| 940684 | 3/1956 | Fed. Rep. of Germany | 411/446 |
| 1500720 | 5/1969 | Fed. Rep. of Germany | 411/69 |
| 3304071 | 8/1984 | Fed. Rep. of Germany | 411/82 |

Primary Examiner—Neill R. Wilson
Attorney, Agent, or Firm—Sughrue, Mion, Zinn, Macpeak & Seas

[57] ABSTRACT

The present invention relates to fixing pegs suitable for being implanted in a friable material such as expanded polystyrene, for example. The peg comprises at least one tab (1-3) made from a thin plate and having a pointed first end (11-13). A head (15) fixed to the second end of the tab(s) is larger in section than the tabs. A closed pouch (20) capable of being punctured and suitable for containing glue co-operates with pouch-puncturing means (21) associated with the tab and pouch-maintaining means (22, 23) co-operating with the tab in such a manner that when thrust is applied to the pouch in a direction including a component directed substantially away from the pointed end of the tab towards the head, then the pouch is punctured and the glue can run over at least a portion of the wall of the tab.

10 Claims, 2 Drawing Sheets

FIXING PEG FOR USE IN FRIABLE MATERIALS

The present invention relates to fixing pegs for use in relatively friable materials, e.g. expanded polystyrene which is very widely used, in particular, for providing thermal insulation in domestic, industrial, or commercial premises. It should be understood that the term "fixing peg" is used to cover any system suitable for being inserted into a support in order to be fixed thereto and provide a fastening point for any other object.

BACKGROUND OF THE INVENTION

In numerous technical and industrial applications, there is a need to use materials which are relatively friable, even if they show a degree of stiffness when presented in the form of plates or panels, optionally covered with a protective sheet glued over one of the large-dimension faces. These materials can generally withstand extraction forces only if the forces are spread widely so as to keep force density per unit area as low as possible.

However, it is clear that in some cases it is not possible to spread the applied forces in such a way, in particular when it is necessary, for example, to fix external elements on such panels using peg- or plug-type fixing systems.

The pegs currently used are unsuitable for achieving this aim. They include a spike which may optionally be twisted and which is surmounted by a head and they are not retained in friable material since the retention forces exerted on the spike by the material are insufficient to prevent the slightest force applied to the head pulling this type of peg out of the material. Naturally, there are other systems which comprise a peg that is placed in a lead hole made in the material, with the end of the peg that is inserted in the hole being capable of being expanded sufficiently to anchor itself against the side wall of the lead hole. This technique is not satisfactory either, since the very large forces exerted by said expanding end rapidly destroy the wall of the hole, thus reducing fixing reliability.

The object of the present invention is to mitigate the above-mentioned drawbacks and provide a peg for fixing in friable materials with retention forces that can be spread over a maximum amount of area in order to enable the peg to be held in the material more reliably than prior art pegs.

SUMMARY OF THE INVENTION

More precisely, the present invention provides a fixing peg suitable for being implanted in a friable material such as expanded polystyrene, for example, the peg comprising:

at least one oblong tab made from a thin plate of stiff material, said tab having a first end suitable for penetrating into said friable material;

a head fixed to the second end of said tab, the section of said head being larger than the cross-section of said tab so that together they form a shoulder;

wherein the peg further comprises:

a closed pouch made of a flexible material capable of being punctured and suitable for containing a glue capable of gluing together the friable material and the rigid material of said tab;

puncturing means associated with said tab for puncturing the pouch; and means for maintaining said pouch in co-operation with said tab in such a manner that when thrust is applied to said pouch having at least a component substantially oriented from the first end of the tab towards the second end thereof, said pouch co-operates with said puncturing means to enable said glue to run over at least a portion of the wall of said tab.

BRIEF DESCRIPTION OF THE DRAWINGS

Embodiments of the invention are described by way of example with reference to the accompanying drawings, in which.

DETAILED DESCRIPTION

Figure 1:
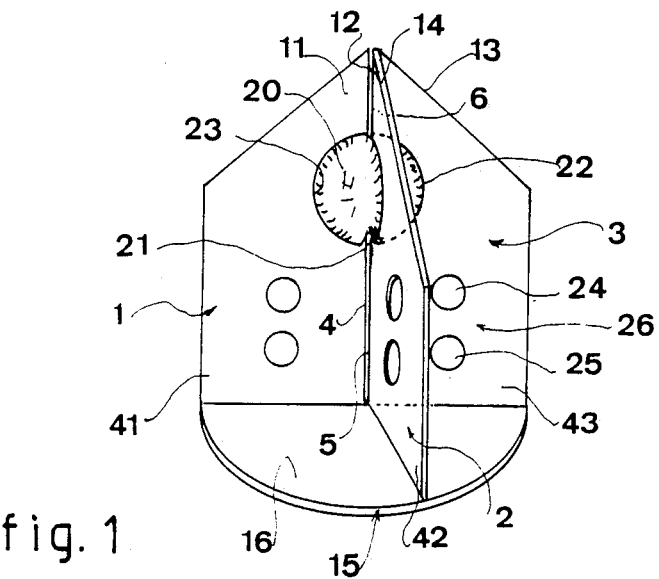
FIG. 1 is a perspective view of one embodiment of a peg in accordance with the invention.

A fixing peg suitable for being implanted in a friable material such as expanded polystyrene, for example, comprises at least one oblong tab 1 made from a thin plate of stiff material, e.g. metal or plastic. This tab has a first end 11 shaped to have a penetrating tip in the same manner as the tabs of certain kinds of drawing pin, and it is advantageously shaped to cut sharply in order to avoid damaging the friable material around the tab when it penetrates therein. In the example shown in FIGS. 1 and 2, the peg comprises three adjacent tabs 1, 2, and 3 meeting along one of their thin edges 4, 5, or 6, and having their first ends 11, 12, and 13 shaped as cutting-edged tips whose points substantially coincide at a single point constituting the penetration point 14, whereby the peg as a whole penetrates into the material.

In this case, the various tabs advantageously form dihedrals with one another substantially about a common ridge line and at angles of substantially 120° from one another, and their pointed first ends are formed to have a cutting chamfer.

This peg also has a head 15 fixed to the opposite end of the tab 1 from its pointed end, the area of said head being larger than the cross-section of the tab so as to form a shoulder 16 therewith. In the embodiment of the peg shown in FIGS. 1 and 2, the head 15 is fixed to the ends 41, 42, and 43 of all three tabs 1, 2, and 3 opposite to their pointed ends, and together with the tabs, it constitutes a shoulder 16 somewhat like that of the above-mentioned drawing pin.

However, the peg also includes a closed pouch 20 made of a flexible material that is relatively easy to puncture, e.g. a thin sheet of plastic, waterproof plastified paper, or aluminum. This material must also be suitable for containing and conserving a quantity of glue 36 for gluing together the rigid material from which the tabs are made and the friable material in which the peg is intended to be inserted, with the nature of the glue 36 naturally being selected as a function of the properties of these materials.

The peg also includes pouch-puncturing means associated with the tabs, or with the single tab if the peg has only one tab, together with means for holding the pouch 20 so that it co-operates with the tab in such a manner that when a thrust force is applied on the pouch having at least a component running substantially from the penetrating point 14 of the peg towards its head 15, then the pouch is caused to co-operate with the puncturing means in order to cause the glue 36 to leak out and run over at least a portion of the side walls of the tab(s). As explained below, this causes a portion of the friable material in the vicinity of the tab(s) to be impregnated, thereby both consolidating the friable material and gluing it to the tab material.

In an advantageous embodiment, the puncturing means are constituted by a pointed portion 21 fixed to the tab(s) and pointing in the same direction as the point(s) 11 (12, 13) of the tab(s).

The means for maintaining the pouch in co-operation with the tab 1 are advantageously constituted by an opening 22 made in the tab and having, for example, a cross-section which is smaller than that of the pouch when filled with glue, such that the full pouch is wedged against the edge 23 of the opening. It may be observed that this opening advantageously passes right through the tab, thereby allowing the full pouch to project beyond both sides thereof once installed in the opening. In the embodiment of the peg shown, having three tabs, the opening 22 is made in each tab and is open to the common ridge line of the dihedrals they form. When the pouch full of glue is placed in the opening, its wall is held by the three edges 23 which surround it, and possibly compress it a little.

In an advantageous embodiment, the pointed portion 21 for puncturing the pouch is integral with the tab on the edge 23 of the opening 22, and in the embodiment shown, it is advantageously situated on the common ridge line of the dihedrals and makes contact with the wall of the pouch when the pouch is placed in the opening as described above.

In an embodiment which may comprise an advantageous improvement, each tab also includes at least one hole 24, 25 made through its portion 26 lying between the opening 22 and the head 15.

Figure 2:
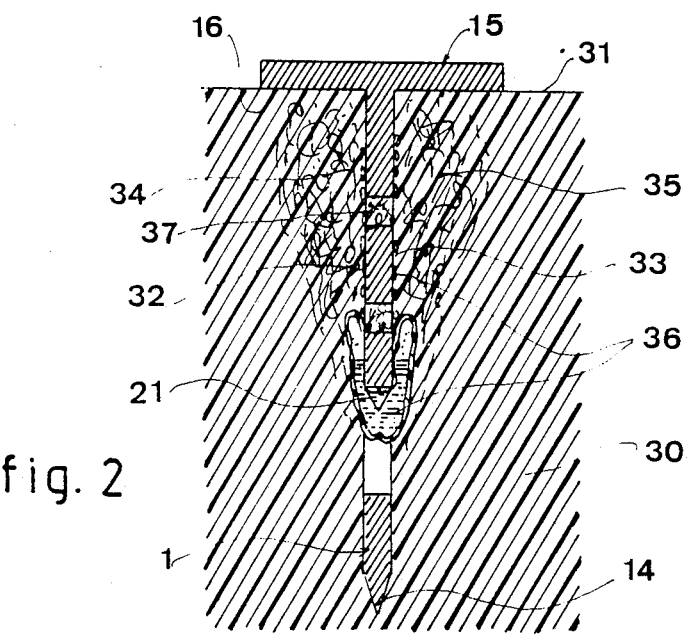
FIG. 2 is a diagrammatic section view through a peg as shown in FIG. 1 in an application for fixing an item to a panel, e.g. of expanded polystyrene.

The peg whose structure is described above is used as described below with reference more particularly to FIG. 2.

The peg including its pouch 20 full of glue 36 suitable for gluing the friable material 30 to the material of the tab 1 is brought up to the support into which it is to be inserted and fixed, so that its penetration point 14 comes into contact with the surface 31. By applying appropriate pressure to the head 15, the tab 1 is caused to penetrate into the material, advantageously by cutting it, until the pouch comes into contact with the surface 31. The force applied on the head then sets up a reaction force between the surface 31 and the pouch 20, thrusting the pouch away from the point 14 towards the head 15, thereby pressing the pouch more and more firmly against the pointed portion 21. This pointed portion then pierces the pouch and allows the glue 36 to run into the small spaces 32 and 33 that exist between the walls of the tab and the friable material, and between the particles themselves of said material, as the tab is pressed further into the material, while simultaneously flattening the pouch so as to squeeze out a maximum amount of glue. The peg is pressed into the material until the shoulder 16 comes directly or indirectly into contact with the surface 31 depending on whether or not an auxiliary part is imprisoned thereby.

While the fixing peg is being pressed into the support made of friable material, the glue 36 begins by diffusing into the regions 34 and 35 of the material located in the vicinity of the spaces 32 and 33. The material is thus impregnated and will be consolidated when the glue sets. Simultaneously, the glue situated in the spaces 32 and 33 between the tab and the friable material will glue the side walls of the tab to the portions 34 and 35 of the friable material so that the fixing of the tab in the material is locally reinforced. In addition, the walls obtained by the friable material being cut as the peg penetrates therein and overlying opposite ends of the holes 24 and 25 are themselves likewise impregnated with the glue 36 and are thus glued together when the glue sets, thereby constituting a bridge between the two regions 34 and 35 of the material and thus further improving the reliability with which the peg is fixed.

Naturally, and in conventional manner, an external element could be fixed by being engaged between the head 15 and the surface 31. This well-known technique of fixing such an element is not shown in order to keep the drawing simple.

Figure 3:
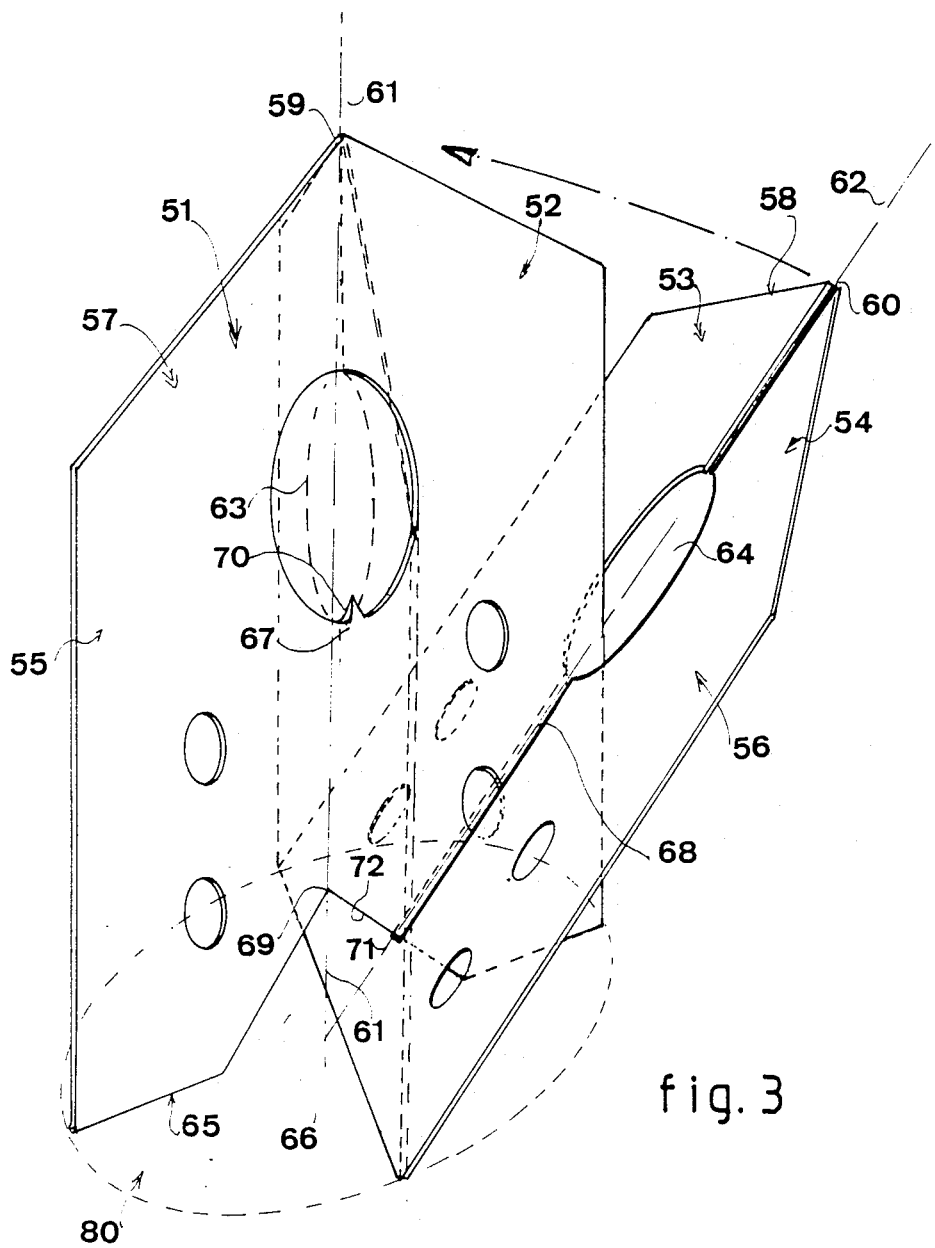
FIG. 3 shows another embodiment of a peg of the invention which is particularly advantageous for mass production of the peg.

FIG. 3 shows another embodiment of a peg in accordance with the invention and having an undoubted advantage with respect to making mass production of the peg very simple. The peg shown in FIG. 3 comprises four tabs 51 to 54 of the type specified above which are interconnected in pairs to form two plane parts 56 and 57 which are capable of being disposed, once finally assembled, at 90° to each other.

Each of the plane parts 55 and 56 is made, for example, by being stamped out from a thin plate having one end 57, 58 cut to form the V-shaped tip 59, 60, said tip constituting the penetration point of the peg, and having both branches of is V-shape advantageously shaped to constitute cutting edges.

Each plane part includes a through opening 63, 64 centered on its axis of symmetry 61, 62 passing through the tip 59, 60, with both openings being at the same distance from the tip.

In one of the plane parts, in this case the part 55, its end 65 furthest from its V-shaped point has a notch 66 centered on the axis of symmetry 61. The depth of this notch is less than the distance between the end 65 and the closest portion 67 of the edge of the opening 63. As for the second plane part, i.e. the part 56 in the example shown, it includes a notch 68 running along the axis of symmetry 62 and slightly wider than the thickness of the part 55. The slot 68 runs through the opening 64 since it is cut all the way from the tip 60 and extends over a length which is slightly greater than the distance between the tip 59 of the plate 55 and the deepest point 69 of the notch 66.

As before, the tabs 51 to 54 are associated with puncturing means represented diagrammatically by a puncturing portion 70 defined in the opening 63, for example, in the vicinity of the portion 67 of its edge.

The two parts described above constituting the four tabs are easily manufactured by stamping, e.g. using a hollow punch.

In order to obtain a peg having its final structure, the glue-filled pouch is placed in the opening 63 and is temporarily held therein by hand. Thereafter the second part 56 is placed so that the bottom 71 of its notch 68 engages the edge 72 of the notch 66. If both plates from which the above-described parts are made are relatively stiff, the part 66 is then caused to pivot about an axis substantially perpendicular to the plane of the part 55 until the two axes of symmetry 61 and 62 substantially coincide, as do the two tips 59 and 60. By virtue of the positions of the openings 63 and 64 within each of the parts 55 and 56, their centers substantially coincide and their edges then lie in two perpendicular planes imprisoning and holding the pouch of glue.

If the plates are relatively flexible, then the two parts may be associated with each other via their notch and slot so as to occupy substantially the same plane. The pouch of glue is then placed in both openings while they substantially overlie each other, and then the two parts are rotated relative to each other about their common axis of symmetry until they occupy two planes which are substantially perpendicular, thereby enabling them to imprison the pouch of glue, as described above.

Once the two plane parts 55 and 56 have been positioned in this way, the peg is terminated by associating these two parts 55 and 56, e.g. by welding or soldering, with a head 80 to constitute a shoulder as described above at reference 15 with reference to FIGS. 1 and 2.

This embodiment of the peg is used in exactly the same way as that described above, and use is therefore not describe again

I claim:

1. A fixing peg suitable for being implanted in a friable material such as expanded polystyrene, for example, the peg comprising:
   at least one oblong tab made from a thin plate of stiff material, said tab having a first end suitable for penetrating into said friable material;
   a head fixed to the second end of said tab, the section of said head being larger than the cross-section of said tab so that together they form a shoulder;
   wherein the peg further comprises:
   a closed pouch made of a flexible material capable of being punctured and suitable for containing a glue capable of gluing together the friable material and the rigid material of said tab;
   puncturing means associated with said tab for puncturing the pouch; and
   means for maintaining said pouch in co-operation with said tab in such a manner that when thrust is applied to said pouch having at least a component substantially oriented from the first end of the tab towards the second end thereof, said pouch co-operates with said puncturing means to enable said glue to run over at least a portion of the wall of said tab.

2. A peg according to claim 1, wherein said puncturing means are constituted by a pointed portion integral with said tab and directed towards the first end of said tab.

3. A peg according to claim 1, wherein the means for maintaining said pouch in co-operation with said tab are constituted by an opening formed in said tab.

4. A peg according to claim 3, wherein said opening goes right through said tab.

5. A peg according to claim 1, wherein said pointed portion is integral with said tab on the edge of said opening.

6. A peg according to claim 3, wherein said tab includes at least one hole formed through that portion of said tab which is situated between said opening and said head.

7. A peg according to claim 1, wherein said first end of said tab has a cutting edge, which is advantageously chambered.

8. A peg according to claim 1, including at least two tabs which are adjacent to each other via an edge so as to constitute a dihedral.

9. A peg according to claim 8, including four tabs together forming dihedrals sharing a common ridge with dihedral angles being substantially equal to 90°.

10. A peg according to claim 9, wherein said four tabs are associated in pairs in order to form two plane parts each having an axis of symmetry and each having a through opening centered on the axis of symmetry, a first one of the two plane parts including a notch centered on its axis of symmetry and formed outside said opening, the second plane part including a slot whose width is slightly greater than the thickness of said first part and which extends along said axis of symmetry of said second part, said slot passing through said opening formed in said second part, with the distance between the end of said slot and the edge of said opening being not less than the distance between the bottom of the notch from the edge of the opening made in said first part, said two parts being associated in two planes which are substantially perpendicular by means of their slot and notch in such a manner that the end of the slot faces the bottom of the notch and their two openings are substantially centered on each other, with said pouch of glue being imprisoned in the space delimited by the edges of said two openings.

* * * * *